(12) United States Patent
Jensen

(10) Patent No.: US 6,299,558 B1
(45) Date of Patent: Oct. 9, 2001

(54) DRIVE MECHANISM HAVING BOGIES

(75) Inventor: Brian D. Jensen, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 08/994,159

(22) Filed: Dec. 19, 1997

(51) Int. Cl.[7] .................................................. F16H 55/12
(52) U.S. Cl. .............................................. 474/163; 474/161
(58) Field of Search ........................... 474/94, 161, 162, 474/163

(56) References Cited

U.S. PATENT DOCUMENTS

| | | | |
|---|---|---|---|
| 780,533 | * 1/1905 | Sheley | 474/163 X |
| 1,486,590 | 3/1924 | Landahl | 474/163 X |
| 1,493,863 | 5/1924 | Miller | 474/163 X |
| 3,205,022 | * 9/1965 | Eckert-Greifendorff et al. | 474/163 X |
| 3,824,869 | 7/1974 | Murphy | 474/163 X |
| 3,916,708 | * 11/1975 | Durand | 474/161 |
| 5,026,329 | * 6/1991 | Diekevers | 474/162 |
| 5,443,425 | * 8/1995 | Korenberg et al. | 474/163 |

* cited by examiner

Primary Examiner—Thomas R. Hannon
(74) Attorney, Agent, or Firm—Kevin M. Kercher

(57) ABSTRACT

A drive system for use in a machine has a drive wheel and a chain. A plurality of bogies each having at least one hook are pivotally connected about the drive wheel at pre-selected spaced circumferential locations. A spring member is positioned between the bogie and the drive wheel to pre-position the bogie for engagement of the pins. The pivotal movement of the bogies in combination with the spring members reduces noise and the effects of chordal action as the bogies engage the pins through rotation of the drive wheel.

6 Claims, 2 Drawing Sheets

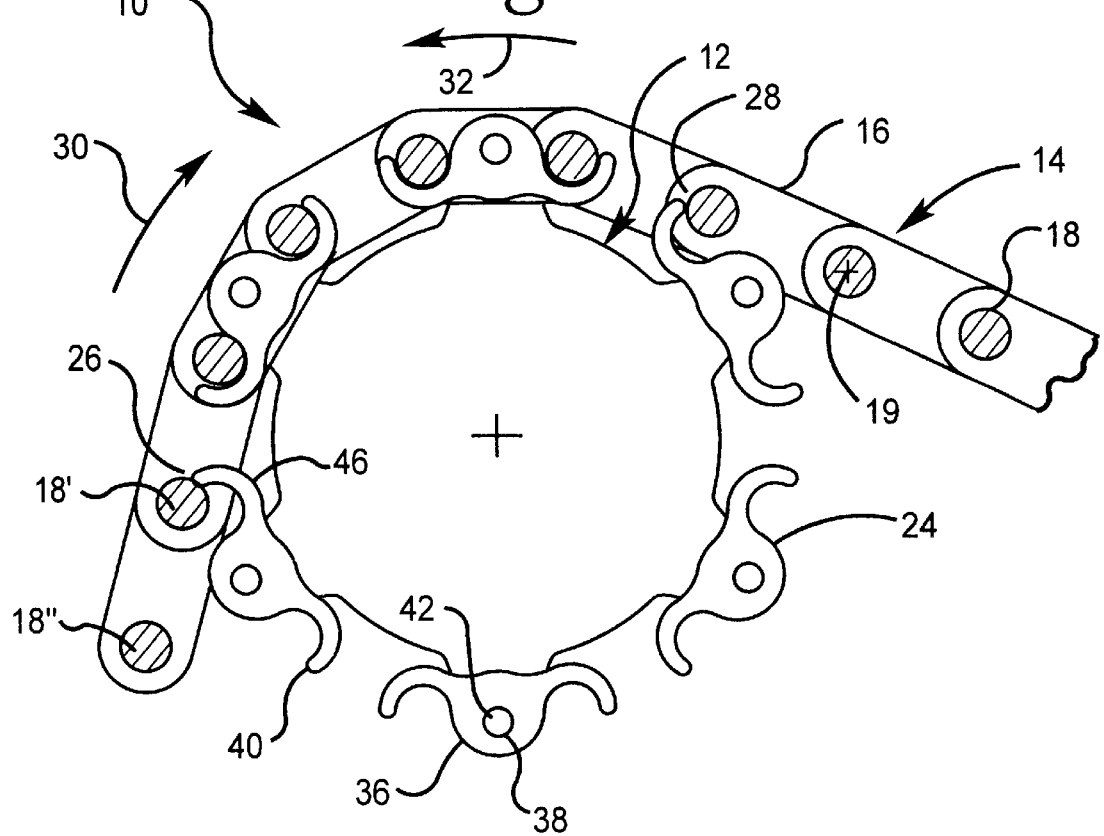
*Fig. - 1 -*
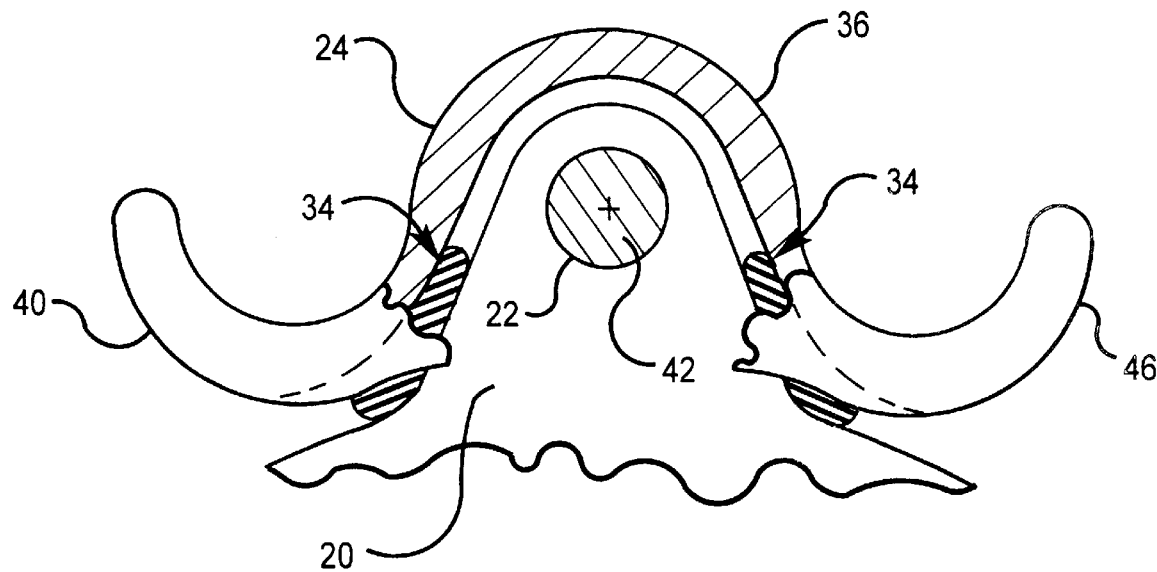
*Fig. - 3 -*

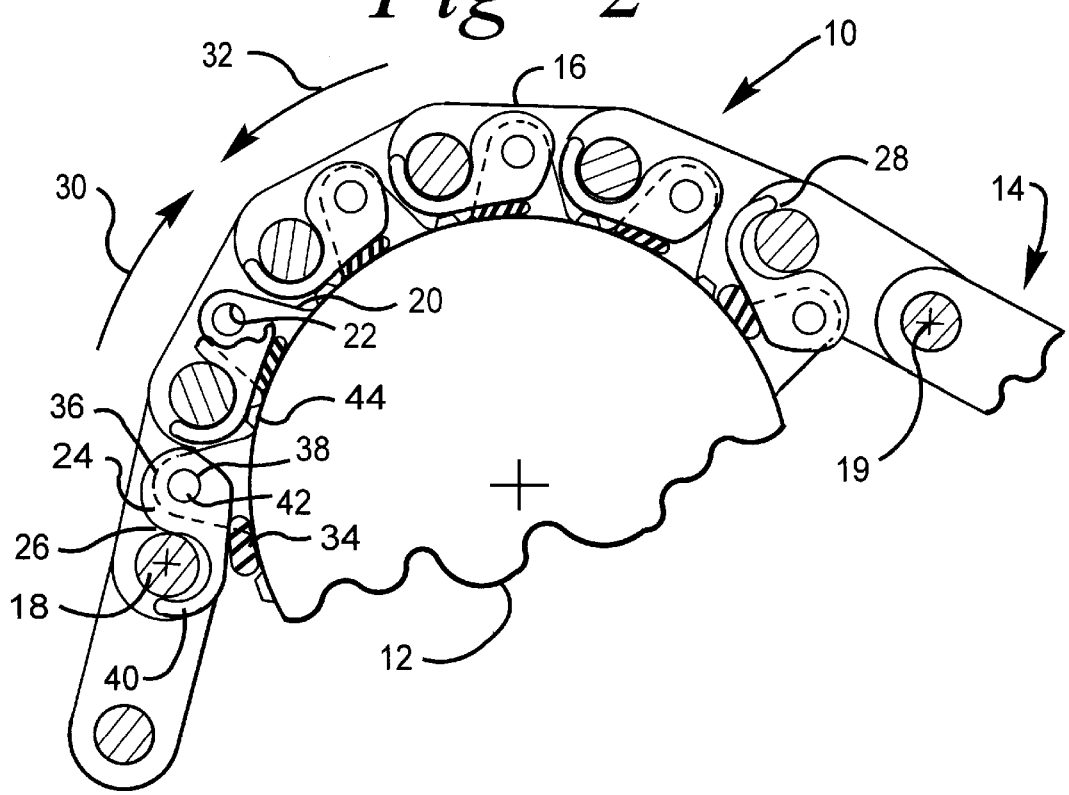
*Fig - 2 -*

DRIVE MECHANISM HAVING BOGIES

TECHNICAL FIELD

This invention relates generally to drive wheels and more particularly to drive wheels having pivotally mounted bogies to drive a chain.

BACKGROUND ART

Current designs of chain drive systems in a machine use a sprocket to drive the chain. The sprocket is typically a circular member with teeth positioned on its periphery to engage the link retaining pins of the chain. The chain is driven to perform a source of work in a machine such as a conveyor system or a track-type tractor. For example, a track-type tractor has a chain that encircles a portion of and is driven by a sprocket. Some of the problems encountered with a sprocket and chain drive system is noise and vibration and what is known as chordal action. Chordal action is defined as a rise and fall of the chain links, of the engaging portion of the chain, in a radial direction from the center of the sprocket as each of the pins are engaged by and through rotation of the sprocket. Rise is defined as travel of the links in an outwardly radial direction from the center of the sprocket as each one of the pins engages the sprocket and is carried through a portion of rotation of the sprocket. Fall is defined as the travel of the links in an inwardly radial direction toward the center of the sprocket through the remaining portion of rotation of the sprocket. The rise and fall of the chain links induces an oscillating motion in the non-engaged portion of the chain. During the fall motion of the chain, each of the pins to be engaged by the sprocket will impact the sprocket as it is engaged, thereby causing noise, vibration and wear.

The present invention is directed to overcoming one or more of the problems as set forth above.

DISCLOSURE OF THE INVENTION

In one embodiment of the present invention, a drive system has at least two wheels and a chain extending around the wheels having a plurality of links interconnected by transverse pins. At least one of the wheels drives the chain through engagement of the pins and rotation of the at least one wheel. In accordance with this invention, a plurality of bogies each having a first hook adapted to receive one of the pins is pivotally connected to a first one of the wheels. The bogies are positioned such that the hooks receive and carry pre-selected ones of the pins of the chain from an engagement position to a release position during rotation of the first wheel. An impact absorbing cushion member is disposed between each of the bogies and the first wheel, whereby the cushioning member absorbs the impact between the pins and the bogie.

BRIEF DESCRIPTION OF THE DRAWINGS

FIG. 1 is a diagrammatic side view of an embodiment of a chain drive system incorporating an embodiment of the subject invention;

FIG. 2 is a diagrammatic side view of a drive wheel assembly showing another embodiment of the subject invention; and FIG. 3 is a diagrammatic side view showing a portion of a drive wheel assembly of the chain drive system.

BEST MODE FOR CARRYING OUT THE INVENTION

Referring to the drawings, with particular reference to FIG. 1, a drive system 10 for a machine has a drive wheel assembly 12 (hereafter referred to as the drive wheel 12) and a chain 14 having a plurality of links 16 and pins 18. Each of the pins 18 has a central axis 19. The machine (not shown) may be, for example, a track-type tractor, conveyor or other device. The drive wheel 12 drives the chain 14 through engagement of the pins 18 as rotation of the drive wheel 12 occurs. The chain 14 shown is of a construction typically used in earth moving machines, but can be of any construction which provide a pin, bushing, or other element for driving engagement with a rotating wheel.

With reference also to FIGS. 2 & 3, the drive wheel 12 has a plurality of protuberant mounts 20 which are bell shaped and are positioned about the drive wheel 12 at pre-selected spaced circumferential locations. The mounts 20 are connected to the drive wheel 12 by being either an integral part of the drive wheel 12 or by welding. Each of the mounts 20 has a bore 22 positioned in the upper portion of the mount 20 and extending therethrough.

A plurality of bogies 24 is provided to engage with the chain 14. Each bogie 24 has a hook or receptor 40 of any construction sufficient for purposes hereafter explained and is pivotally connected to the mount 20. The bogies 24 are positioned such that the hooks 40 carry pre-selected pins 18 of the chain 14 from an engagement position 26 to a release position 28 during rotation of the drive wheel 12. It should be understood that the drive wheel 12 for both illustrated embodiments can rotate in a first or clockwise direction 30 and in a second or counter clockwise direction 32, as will be explained, to drive the chain 14 as known in the art.

Each of the bogies 24 has a respective cushioning or spring member 34 positioned between the bogie 24 and the drive wheel 12 at a pre-selected location. The embodiment in FIG. 2 shows a one piece spring member 34. Alternatively, the spring member 34 could also be two pieces as shown for the embodiment in FIG. 3.

With particular reference to FIGS. 2 & 3, each of the bogies 24 has a body 36 with a bore 38 extending therethrough. The first arcuate shaped hook 40 is connected to the body 36. The bogie 24 is positioned about the mount 20 so that the bogie 24 will straddle the mount 20 when connected. A pin 42 is positioned within the bore 38 of the body 36 and the bore 22 of the mount 20 to pivotally connect the bogie 24 to the mount 20. It will be understood that the pin 42 referred to herein could include any form of fastener for connecting one member to another which allows pivotal movement of one member with respect to another. It will also be understood that the mount 20 for the bogies 24 can also include other embodiments such as a spherical member and socket or a cylindrical member and socket to connect the bogies 24 to the drive wheel 12.

The spring member 34 is positioned such that it will engage a portion of the body 36 and the hook 40. However, the spring member 34 could also be positioned between the bogie 24 and the drive wheel 12 such that the spring member 34 engages only the hook 40. The preferred embodiment of the spring member 34 is an elastomeric material such as rubber. It will be understood that the spring member 34 for the bogie 24 can also include other embodiments such as a leaf spring or a coil spring.

A plurality of stops 44 (FIG. 2) extending in a radial direction are connected to the drive wheel 12 about its outer periphery and are positioned at pre-selected spaced circumferential locations about the drive wheel 12, with one stop 44 between each of the bogies 24 and the drive wheel 12. Radial direction referred to herein means extending in an outwardly direction from the center of the drive wheel 12. Each stop 44 is so positioned and of sufficient construction to limit the amount of compression of the spring member 34 by the bogie 24 as the drive wheel 12 carries the chain 14 from an engagement position 26 to a release position 28.

The embodiment as shown in FIGS. 1 and 3 is similar in construction, connection, and function to the embodiment in FIG. 2. The bogie 24 illustrated in FIGS. 1 and 3 also has a second hook 46 and the drive wheel 12 does not have a stop 44. Although the stop 44 is not preferred in the embodiment of FIGS. 1 and 3, it should be understood that some form of stop could be used. The second hook 46 allows the bogie 24 to carry a pair of pins 18 as shown in FIG. 1.

Industrial Applicability

The drive system 10 is used in a machine such as a track-type tractor to reduce noise and vibration. For the embodiment of the bogie 24 as shown in FIG. 2, a respective spring member 34 prepositions the hook 40 of each of the bogies 24 in the engagement position 26 for the first direction of rotation 30. Subsequent to the engagement of the pins 18 during rotation of the drive wheel 12, the spring members 34 are compressed until pivotal movement of the bogies 24 is restricted by the stops 44. The pins 18 of the chain 14, as they are carried, tend to experience lessened effects of chordal action and other machine induced chain motions, because the pivotal movement of the bogies 24 is cushioned by the spring members 34, until approximately the release position 28. After the pins 18 are engaged by the bogies 24, the central axes 19 of the pins 18 are carried at a substantially constant radius from the center of the drive wheel 12 until approximately the release position 28. Also, subsequent to the release position 28, the spring member 34 decompresses and returns the bogie 24 to its initial engagement position 26 to receive another one of the pins 18 at the engagement position 26 through rotation of the drive wheel 12.

The description above for the embodiment of FIG. 2 applies to the second direction of rotation 32 by reversing the order of the engagement position 26 and the release position 28.

For the embodiment of the bogie 24 as shown in FIGS. 1 and 3, in the first direction of rotation 30, the spring member 34 pre-positions the second hook 46 of the bogie 24 in the engagement position 26 to receive one of the pins 18'. Following engagement of the pin 18' by the second hook 46, the portion of the spring member 34 which corresponds to the second hook 46 is compressed and cushions the impact between the pin 18' against the bogie 24. This causes the bogie 24 to pivot and positions the first hook 40 in the engagement position 26 to receive the immediately adjacent or trailing pin 18". Following the engagement of the trailing pin 18" by the first hook 40, the bogie 24 is pivoted substantially back to its normal or engagement position 26, which pivotal movement is cushioned by the corresponding portion of the aforementioned spring member 34. The pivotal movement of the bogie 24 allows for the proper timing of the hooks 40, 46, which cooperates with the cushioning provided by spring member 34 to substantially reduce the impact as the hooks 40, 46 engage the pins 18. The bogie 24 then carries a pair of pins 18 such that their central axes 19 are at a substantially constant radius from the center of the drive wheel 12, until approximately the release position 28. Subsequent to the release position 28 of the second hook 46, the portion of the spring member 34 corresponding to the first hook 40 is compressed positioning the first hook 40 to release its pin 18". Following to the release by the first hook 40, the bogie 24 is returned to its normal or engagement position 26 by decompression of the spring member 34 to continue the sequence as set forth above through rotation of the drive wheel 12.

The description above for the embodiments of FIGS. 1 and 3 applies to the second direction of rotation 32 by reversing the order of the first and second hooks 40, 46 respectively.

The spring member 34 serves a specific purpose for both embodiments as shown in FIGS. 2 and 3. The spring member 34 not only pre-positions the hooks 40, 46 of the bogie 24 for proper engagement of the pins 18, but also cushions the impact of the pin 18 against the bogie 24 and the bogie 24 against the pin 18, thus reducing noise, as the bogies are engaged with the pins 18 of the chain 14. One skilled in the art will note that a cushioned bogie configuration as described above may also be used with non-driving idler wheels. It will be understood that in application for a non-driving idler wheel, the curvature of the hooks 40 and 46 which engage the pins 18, would not need to be such an extreme arcuate shape as shown in FIGS. 1 through 3.

Other aspects, objects and advantages of this invention can be obtained from a study of the drawings, the disclosure and the appended claims.

What is claimed is:

1. In a drive system having at least two wheels and a chain extending around said wheels having a plurality of links interconnected by transverse pins, at least one of said wheels driving said chain through engagement of said pins and rotation of said at least one wheel, the improvement comprising:

a plurality of bogies each having a first hook adapted to receive one of said pins and being pivotally connected to a first one of said wheels, said bogies being positioned such that said hooks receive and carry preselected ones of said pins of said chain from engagement positions to release positions during rotation of said first wheel wherein each of said bogies has a second hook, said second hooks each carrying a preselected other one of said pins of said chain from engagement positions to release positions during rotation of said first wheel; and an impact absorbing cushion member disposed between each of said bogies and said first wheel, whereby said cushioning member absorbs the impact between said pins and said bogie.

2. In a drive system having at least two wheels and a chain extending around said wheels having a plurality of links interconnected by transverse pins, at least one of said wheels driving said chain through engagement of said pins and rotation of said at least one wheel, the improvement comprising:

a plurality of bogies each having a first hook adapted to receive one of said pins and being pivotally connected to a first one of said wheels, said bogies being positioned such that said hooks receive and carry preselected ones of said pins of said chain from engagement positions to release positions during rotation of said first wheel; wherein each of said bogies has a second hook, said second hooks each carrying a preselected other one of said pins of said chain from engagement positions to release positions during rotation of said first wheel;

an impact absorbing cushion member disposed between each of said bogies and said first wheel, whereby said cushioning member absorbs the impact between said pins and said bogie wherein each of said cushion members comprises a spring member and wherein each of said bogies is positioned by one of said spring members at said engagement position for said first hook to receive said pre-selected one of said pins; and each of said bogies is positioned by its associated said spring member at said engagement position for said second hooks of said bogies to receive said pre-selected other ones of said pins.

3. The improvement as set forth in claim 2, wherein the drive wheel has a first direction of rotation and said spring member prepositions said second hook of said bogie for engagement of the pre-selected other one of said pins and is thereby compressed by said bogie in response to engagement of said selected pin, said first hook being positioned in the engagement position to receive a trailing pin of said pre-selected other one of said pins in response to compression of said spring member as chain is driven in said direction.

4. The improvement as set forth in claim 3, wherein the drive wheel has a second direction of rotation opposite said first direction of rotation and said spring member prepositions said first hook of said bogie for engagement of another selected one of said pins and is thereby compressed by said bogie in response to engagement of said selected pin, said second hook being positioned in the engagement position to receive a trailing pin to said another selected one of said pin in response to compression of said spring member as said chain is driven in said second direction of rotation.

5. A drive wheel assembly for driving a chain, comprising:
  a wheel;
  a plurality of bogies each comprising a first hook, wherein each of said bogies has a second hook;
  a plurality of mounts pivotally connecting said bogies to said wheel at pre-selected spaced circumferential locations about said wheel; and
  an impact absorbing cushion member disposed between each of said bogies and said wheel.

6. An idler wheel assembly for a tracked machine, comprising:
  a wheel;
  a plurality of bogies each comprising a first hook, wherein each of said bogies has a second hook;
  a plurality of mounts pivotally connecting said bogies to said wheel at pre-selected spaced circumferential locations about said wheel; and
  an impact absorbing cushion member disposed between each of said bogies and said wheel.

* * * * *